July 26, 1966 A. M. HAND 3,262,678
FREIGHT TRANSPORTING SYSTEM WITH AN INTERLOCK MECHANISM
ON THE MOTOR CONTROLLER
Filed Jan. 27, 1965 5 Sheets-Sheet 1
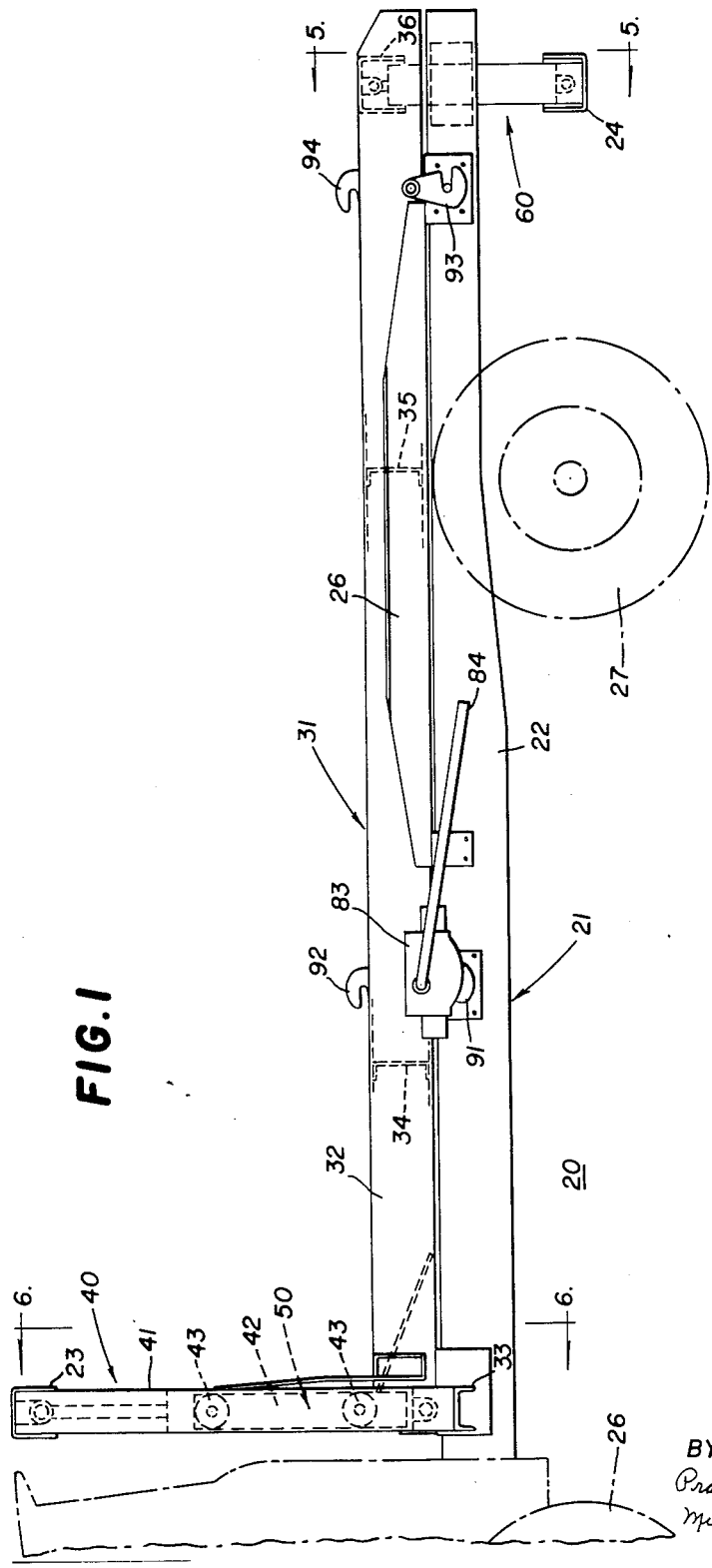
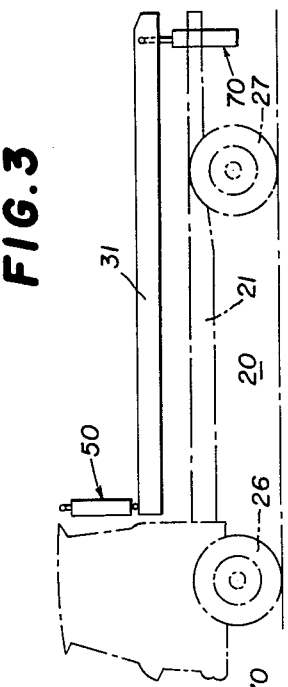
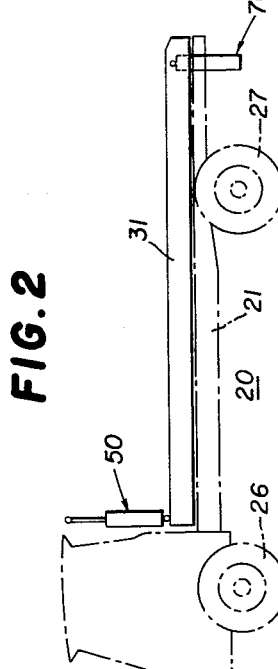
INVENTOR
ALBERT M. HAND
BY
Prangley, Baird, Clayton,
Miller & Vogel,
ATTYS.

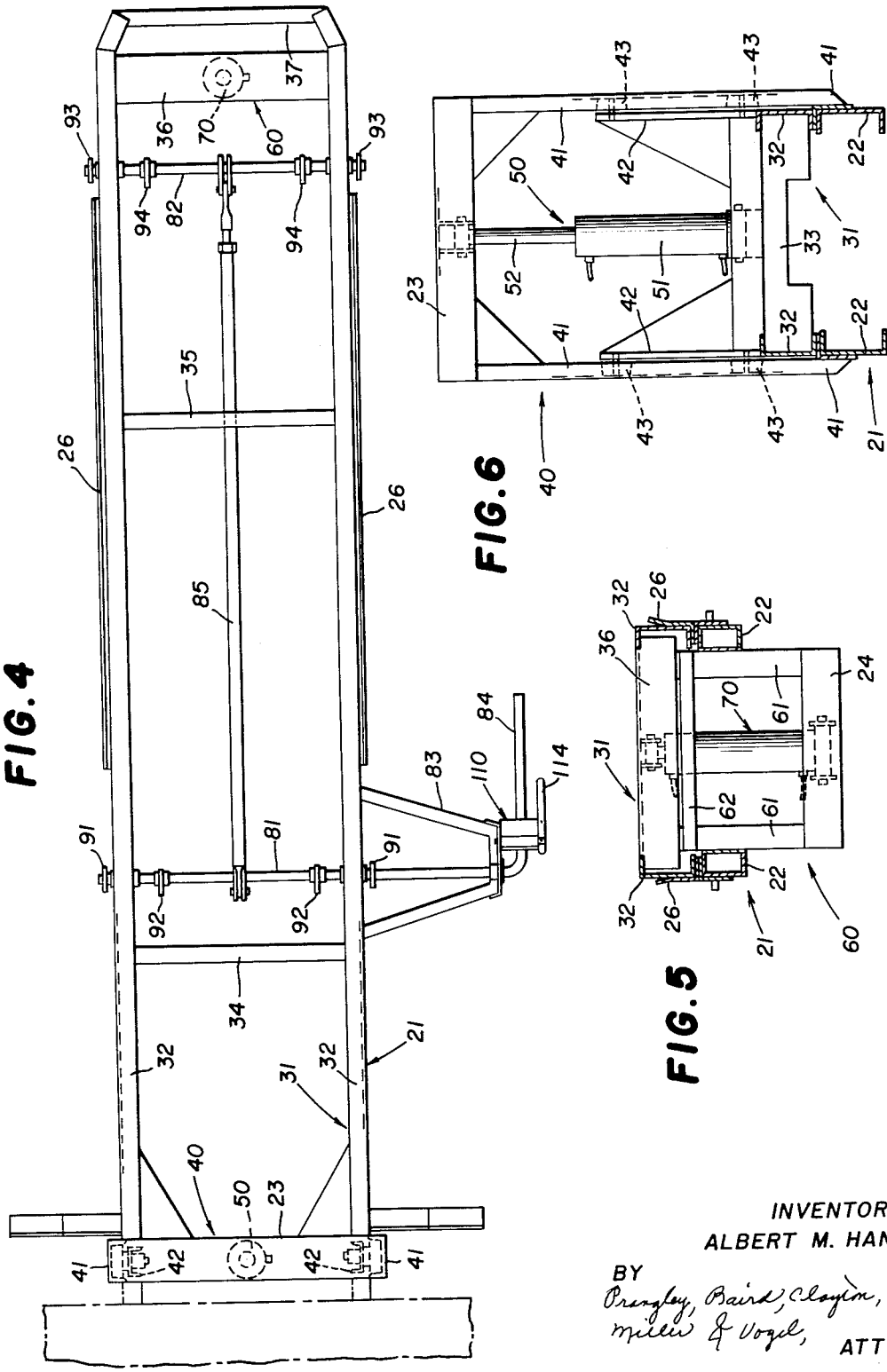

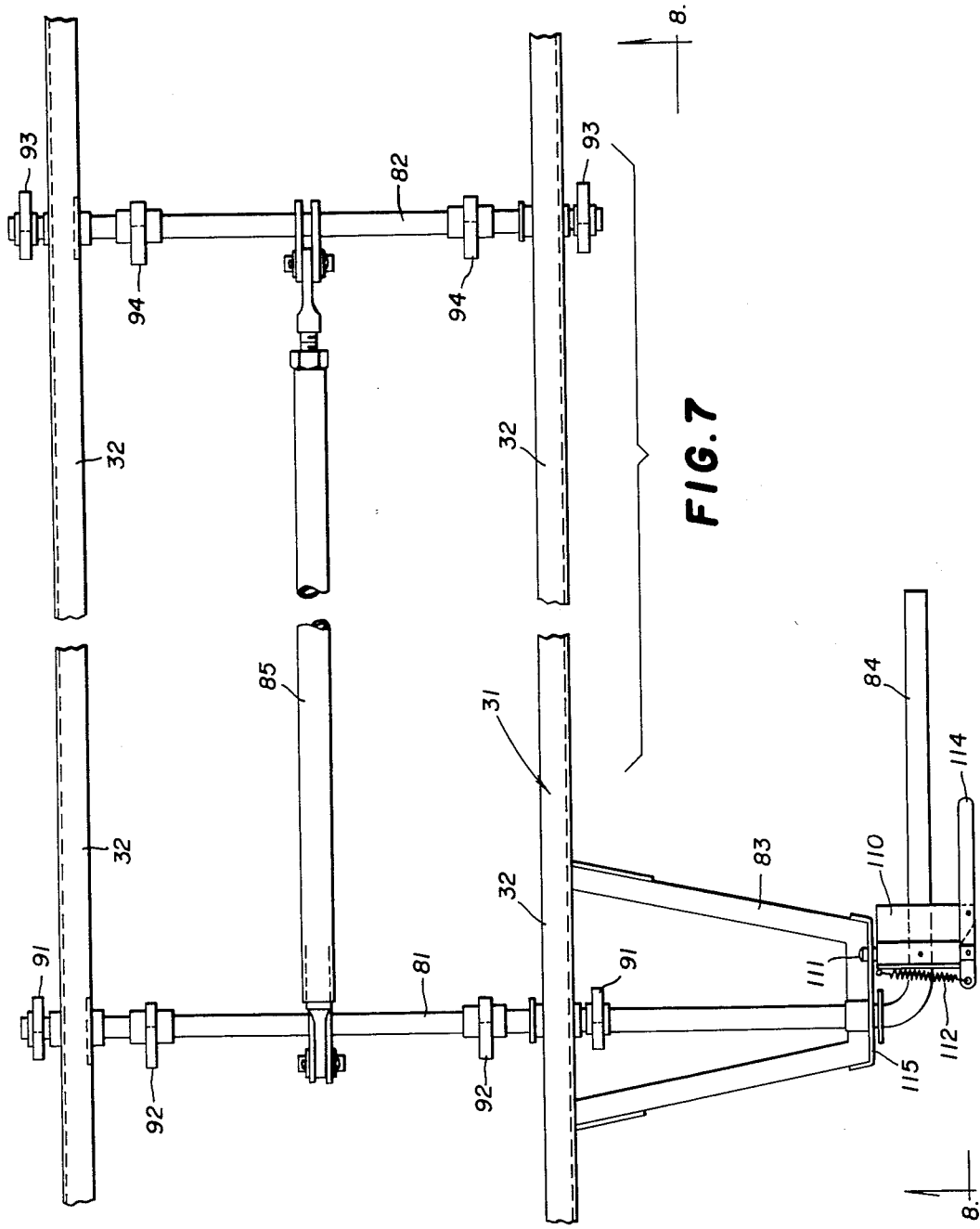

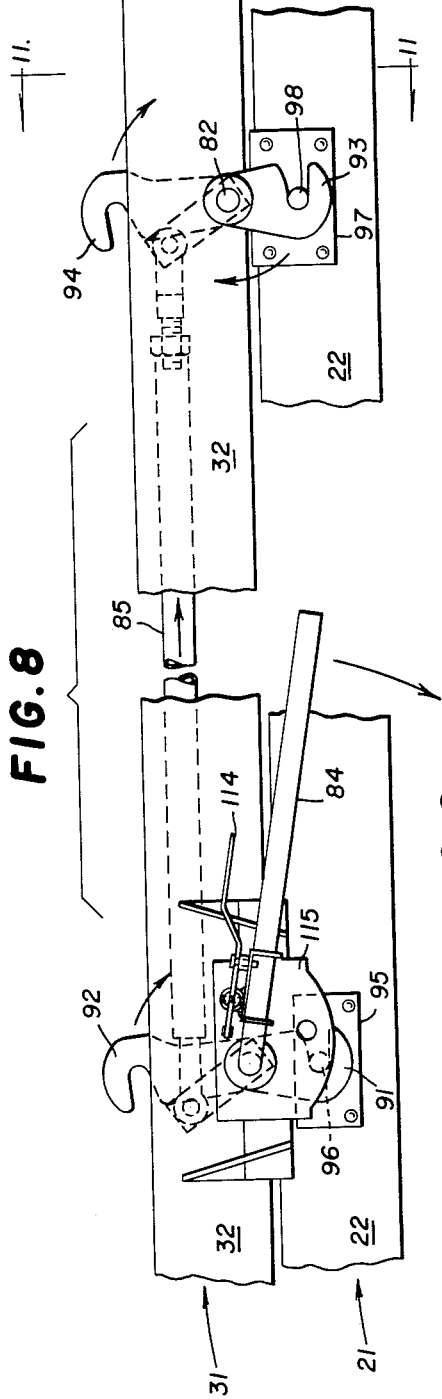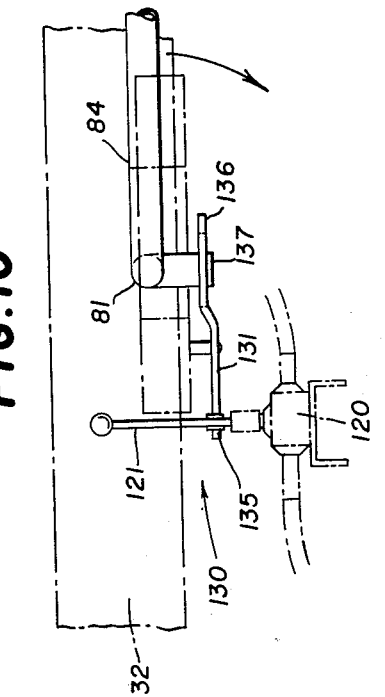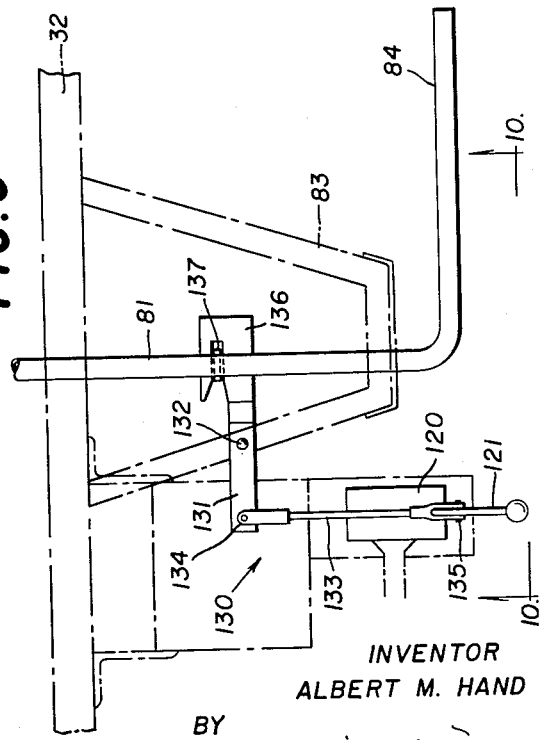

July 26, 1966  A. M. HAND  3,262,678
FREIGHT TRANSPORTING SYSTEM WITH AN INTERLOCK MECHANISM
ON THE MOTOR CONTROLLER
Filed Jan. 27, 1965  5 Sheets-Sheet 5

INVENTOR
ALBERT M. HAND
BY
Prangley, Baird, Clayton,
Miller & Vogel,
ATTYS.

United States Patent Office 3,262,678
Patented July 26, 1966

3,262,678
FREIGHT TRANSPORTING SYSTEM WITH AN INTERLOCK MECHANISM ON THE MOTOR CONTROLLER
Albert M. Hand, Etobicoke, Ontario, Canada, assignor, by mesne assignments, to Steadman Industries Limited, Cooksville, Ontario, Canada
Filed Jan. 27, 1965, Ser. No. 428,352
10 Claims. (Cl. 254—2)

The present invention relates to freight transportation systems, and it is a general object of the invention to provide a road vehicle of improved construction and arrangement and including an elongated longitudinally extending chassis carrying an elongated longitudinally extending platform that is adapted to receive and to support a removable freight container of box-like form.

Another object of the invention is to provide a freight transportation system of the character described, wherein the road vehicle further comprises motor facility for selectively moving the platform in the vertical direction between relatively low and high positions with respect to the chassis, thereby to accommodate corresponding manipulation of the freight container when it occupies its supported position upon the top of the platform, with the result that the freight container may be readily loaded and unloaded with respect to the platform and involving an external support of any suitable height within a considerable range.

Another object of the invention is to provide a freight transportation system of the character described, and further comprising latching mechanism coopehating between the chassis and the platform in its low position and the base of the freight container in its supported position, whereby the latch mechanism is selectively operative between latch and unlatch position, so that in the latch position of the latch mechanism the platform in its low position is latched to the chassis and the base of the freight container in its supported positioned is latched to the platform, and so that in the unlatch position of the latch mechanism the platform in its low position is unlatched from the chassis and the base of the freight container in its supported position is unlatched from the platform.

A further object of the invention is to provide a freight transportation system of the character described, and further comprising interlock mechanism between the motor controller and the latch manipulator, so that it is impossible to govern the motor controller to move the platform from its low position into its high position when the latch manipulator occupies its latch position operating the latch mechanism into its corresponding latch position.

Further features of the invention pertain to the particular construction and arrangement of the elements of the freight transportation system, and particularly of the elements of the road vehicle, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a fragmentary side elevational view of a road vehicle including an elongated longitudinally extending chassis carrying an elongated longitudinally extending platform and provided with motor facility for selectively moving the platform between individual low and high positions with respect to the chassis and embodying the present invention;

FIG. 2 is a reduced schematic view of the road vehicle illustrating the platform in its low position;

FIG. 3 is another reduced schematic view of the road vehicle illustrating the platform in its high position;

FIG. 4 is a fragmentary plan view of the road vehicle, as shown in FIG. 1;

FIG. 5 is a rear end elevational view, partly in section, of the chassis of the road vehicle, as shown in FIG. 4;

FIG. 6 is a front end elevational view, partly in section, of the chassis of the road vehicle, as shown in FIG. 4;

FIG. 7 is an enlarged fragmentary plan view of the central portion of the chassis of the road vehicle, as shown in FIG. 4;

FIG. 8 is an enlarged fragmentary side elevational view of the chassis of the road vehicle, as shown in FIG. 7;

FIG. 9 is an enlarged plan view of the front portion of the chassis of the road vehicle, as shown in FIG. 8;

FIG. 10 is an enlarged side view of the front portion of the chassis of the road vehicle, as shown in FIG. 9;

Figure 11:
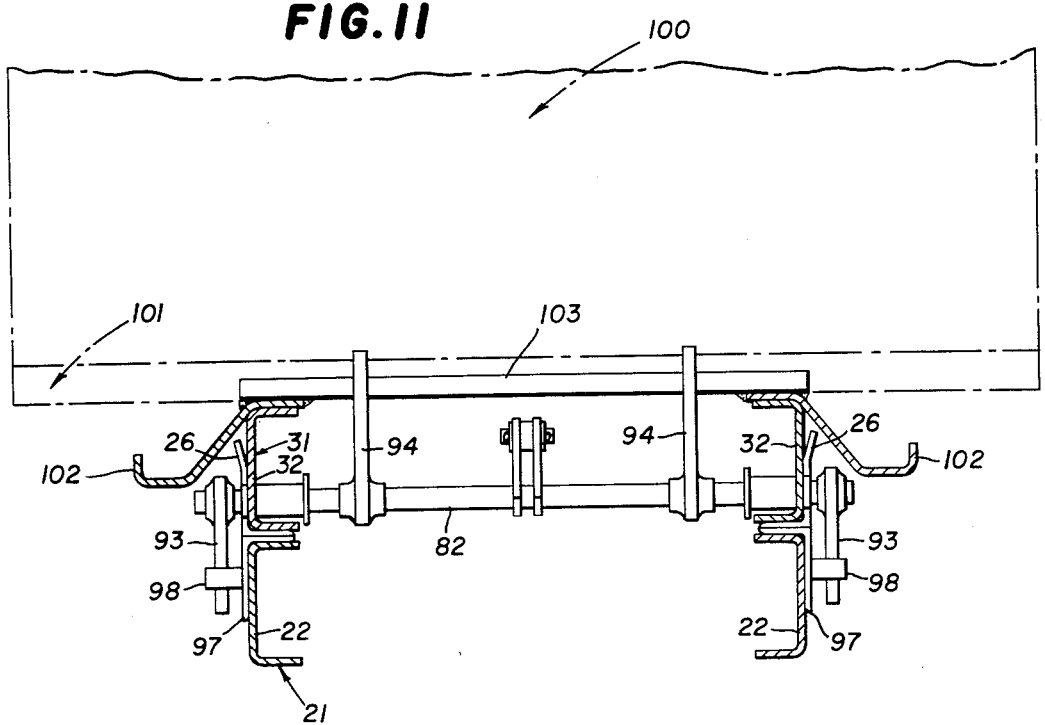
Figure 12:
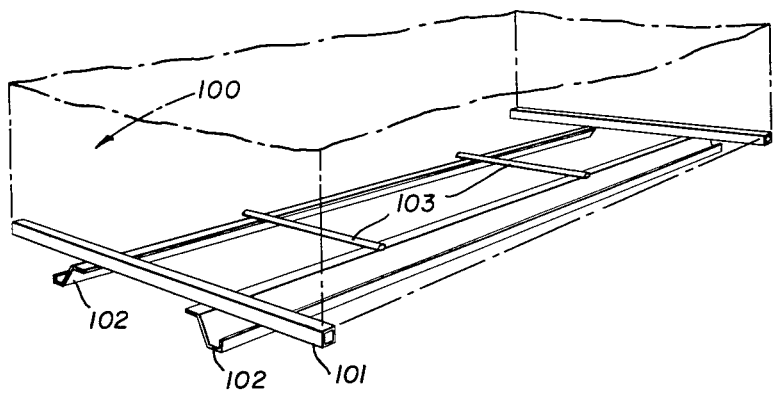

FIG. 11 is an enlarged vertical sectional view of the rear portion of the chassis of the road vehicle, this view being taken in the direction of the arrows along the line 11—11 in FIG. 8; and FIG. 12 is a schematic perspective view of the lower portion of a freight container that may be removably mounted upon the top of the platform carried by the top of the chassis of the road vehicle, as shown in FIG. 10, and forming a part of the present freight transportation system.

Referring now to FIGS. 1 to 6, inclusive, of the drawings, the freight transportation system there illustrated and embodying the features of the present invention comprises a road vehicle 20 that includes an elongated longitudinally extending chassis 21 provided with a pair of longitudinally extending and laterally spaced-apart side channels 22 that are rigidly secured together by a number of laterally extending and longitudinally spaced-apart members 23 and 24. Also, the top of the chassis 21 carries an elongated longitudinally extending platform 31 of skeleton-like structure and including a pair of longitudinally extending and laterally spaced-apart side channels 32 that are rigidly secured together by a member of laterally extending and longitudinally spaced-apart members 33, 34, 35, 36 and 37. The opposite ends of the chassis 21 are suitably supported by front and rear pairs of road wheels respectively indicated at 26 and 27.

More particularly, the platform 31 is substantially congruent with the chassis 21 and is mounted on the top thereof for vertical movements between low and high positions with respect thereto, as respectively illustrated in FIGS. 2 and 3. When the platform 31 occupies its low position with respect to the chassis 21, as shown in FIG. 2, the bottom of the platform 31 directly engages the top of the chassis 21; and when the platform 31 occupies its high position with respect to the chassis 21, as shown in FIG. 3, the bottom of the platform 31 is spaced well above the top of the chassis 21.

As best shown in FIGS. 1, 4 and 6, upstanding structure 40 is provided adjacent to the front ends of the chassis 21 and the platform 31 and interconnecting the same for the purpose of mounting the front end of the platform 31 for the previously mentioned vertical movements with respect to the front end of the chassis 21; which structure 40 includes the members 23 and 33. Specifically, the opposite ends of the chassis member 23 are rigidly secured to the upper ends of two upright channels 41; and the lower ends of the channels 41 are rigidly secured to the adjacent portions of the chassis side channels 22, as shown in FIG. 6. Also, the opposite ends of the platform member 33 are rigidly secured to the lower ends of two upstanding members 42 that are respectively arranged adjacent to the inner sides of the channels 41; and each one of the members 42 carries a pair of vertically spaced-apart rollers 43 that are arranged in guided relation within the inner sides of the channels 41, as shown in FIG. 6.

For the purpose of moving the front end of the platform 31 relative to the front end of the chassis 21, an upstanding front motor 50 is provided that is of the expansion-contraction fluid-operated type, including a cylinder part 51 and a cooperating piston part 52. The lower end of the cylinder part 51 is connected to the platform member 33; and the upper end of the piston part 52 is connected to the chassis member 23. Thus, when the front motor 50 is expanded, as shown in FIG. 6, the front end of the platform 31 is lowered into its low position directly engaging the front end of the chassis 21. On the other hand, when the front motor 50 is contracted, the front end of the platform 31 is elevated into its high position spaced above the front end of the chassis 21.

As best shown in FIGS. 1, 4 and 5, depending structure 60 is provided adjacent to the rear ends of the chassis 21 and the platform 31 and interconnecting the same for the purpose of mounting the rear end of the platform 31 for the previously mentioned vertical movements with respect to the rear end of the chassis 21; which structure 60 includes the members 24 and 36. Specifically, the opposite ends of the chassis member 24 are rigidly secured to the lower ends of two upright members 61; and the upper ends of the members 61 are rigidly secured to the adjacent portions of the chassis side channels 22. Also the upper ends of the members 61 are rigidly secured to a laterally extending cross-brace 62, as shown in FIG. 5. For the purpose of moving the rear end of the platform 31 relative to the rear end of the chassis 21, an upstanding rear motor 70 is provided that is of the expansion-contraction fluid-operated type, including a cylinder part 71 and a cooperating piston part 72. The lower end of the cylinder part 71 is connected to the chassis member 24; and the upper end of the piston part 72 is connected to the platform member 36. Thus, when the rear motor 70 is contracted, as shown in FIG. 5, the rear end of the platform 31 is lowered into its low position directly engaging the rear end of the chassis 21. On the other hand, when the rear motor 70 is expanded, the rear end of the platform 31 is elevated into its high position spaced above the rear end of the chassis 21.

The platform 31 carries latching mechanism that essentially comprises a pair of laterally extending and longitudinally spaced-apart latch bars 81 and 82, as shown in FIGS. 1, 4, 7, 8, 9 and 10. The latch bar 81 is rotatably mounted in the platform side channels 32 adjacent to the front ends thereof and is referred to as the front latch bar; and the latch bar 82 is rotatably mounted in the platform side channels 32 adjacent to the rear ends thereof and is referred to as the rear latch bar. One end of the front latch bar 81 projects laterally outwardly from the adjacent platform side channel 32 and is supported by cooperating laterally projecting structure 83; and the extreme outer one end of the front latch bar 83 terminates in a manually operable handle 84 positioned laterally outwardly from the supporting structure 83; which handle 84 projects longitudinally substantially parallel to the adjacent platform side channel 31 and spaced laterally outwardly therefrom.

The front latch bar 81 is operatively connected to the rear latch bar 82 by a longitudinally extending connecting bar 85; whereby the latch bars 81 and 82 are rotated simultaneously in response to rotation of the handle 84 in an obvious manner. The front latch bar 81 carries a pair of laterally spaced-apart chassis latch members 91 respectively positioned exteriorly of the adjacent platform side channels 32 and a pair of laterally spaced-apart container latch members 92 respectively positioned interiorly of the adjacent platform side channels 32; which latch members 91 and 92 are rigidly secured to the front latch bar 81. Similarly, the rear latch bar 83 carries a pair of laterally spaced-apart chassis latch members 93 respectively positioned exteriorly of the adjacent platform side channels 32 and a pair of laterally spaced-apart container latch members 94 respectively positioned interiorly of the adjacent platform side channels 32; which latch members 93 and 94 are rigidly secured to the rear latch bar 82. As shown in FIG. 8, when the handle 84 is rotated upwardly into its latch position illustrated, all of the latch members 91, 92, 93 and 94 are rotated into their corresponding latch positions. Similarly, when the handle 84 is rotated downwardly into its unlatch position, all of the latch members 91, 92, 93 and 94 are rotated into their corresponding unlatch positions. The latch members 91 and 93 are directed downwardly, when they occupy their latch positions; while the latch members 92 and 94 are directed upwardly, when they occupy their latch positions.

The outer front sides of the chassis side channels 22 respectively carry a pair of latch plates 95 that respectively carry a pair of latch pins 96; which latch pins 96 are respectively latched by slots respectively provided in the latch members 91, when the latch members 91 occupy their latch positions, as shown in FIG. 8; thereby to latch the front end of the platform 31 in its low position to the front end of the chassis 21. Similarly, the outer rear sides of the chassis side channels 22 respectively carry a pair of latch plates 97 that respectively carry a pair of latch pins 98 which latch pins 98 are respectively latched by slots respectively provided in the latch members 93, when the latch members 93 occupy their latch positions, as shown in FIG. 8; thereby to latch the rear end of the platform 31 in its low position to the rear end of the chassis 21.

The top of the platform 31 is adapted to receive and to support a removable freight container 100 of elongated longitudinally extending box-like form and provided with a generally rectangular rigid base 101, as shown in FIGS. 11 and 12. Also, the base 101 includes a pair of longitudinally extending and laterally spaced-apart supporting and guiding rails 102; which rails 102 carry a pair of laterally and longitudinally spaced-apart latch rods 103. When the container 100 occupies its supported position upon the platform 31 and the platform 31 occupies its low position upon the chassis 21, the handle 84 may be operated into its lock position, as shown in FIGS. 1, 4, 7 and 8; whereby the latch members 91 and 93 respectively latch the front and rear ends of the platform 31 to the corresponding front and rear ends of the chassis 21, as previously explained; and simultaneously, the latch rods 103 are respectively latched by slots respectively provided in the latch members 92 and 94; whereby the front and rear ends of the base 101 are respectively latched to the front and rear ends of the platform 31. The guide rails 102 are not only adapted to support the base 101 when the container 100 is placed upon some external support, not shown, but these guide rails 102 guide and center the container 100 in the lateral direction when it is loaded and unloaded with respect to the platform 31. The placement and removal of the container 100 upon the platform 31 may be effected in any suitable manner, not disclosed in detail herein.

For the purpose of guiding the platform 31 into its low position and of preventing any lateral movements of the platform 31 in its low position and with respect to the chassis 21, a pair of elongated longitudinally extending wing-like guide plates 26 are rigidly secured to the outer sides of the chassis side channels 12, as shown in FIGS. 1, 4, 5, and 11.

Referring now to FIGS. 4, 7 and 8, the handle 84 carries lock mechanism 110 that includes a bolt 111 that is biased by a coil spring 112 into an inwardly thrust lock position; which bolt 111 may be moved outwardly against the bias of the spring 112 into an unlock position by a cooperating manually operable lever 114. In turn, the bolt cooperates with a lock plate 115 carried by the extreme outer end of the laterally projecting structure 83, as best shown in FIGS. 7 and 8; which lock plate 115 has two angularly spaced-apart holes formed therein that are adapted respectively to receive the bolt 111, when the handle 84 occupies either its latch position or its unlatch position. Accordingly, the manually operable lock mechanism 110 has lock and unlock positions, and is adapted to lock the handle 84 in place, when the handle 84 occupies either its latch position or its unlatch position, thereby to prevent unintentional movement of the handle 84 out of either of its two latch positions.

The motors 50 and 70 are of the fluid-operated type and may comprise conventional hydraulic-operated type motors; whereby the vehicle 20 comprises a conventional hydraulic system, such, for example, as an oil system, and including a hydraulic control system that is provided with a control valve 120, as illustrated in FIGS. 9 and 10. The control valve 120 includes a manually operable lever 121 and has low and high positions respectively corresponding to the low and high positions of the platform 31. The lever 121 is illustrated in its low position and is operative outwardly as viewed in FIG. 9, into the high position. In its low position, the lever 121 governs the control valve 120, so that the fluid system expands the motor 50 and contracts the motor 70, with the result that the platform 31 is lowered into its low position with respect to the chassis 21, as shown in FIG. 2. On the other hand, in its high position, the lever 121 governs the control valve 120, so that the fluid system contracts the motor 50 and expands the motor 70, with the result that the platform 31 is raised into its high position with respect to the chassis 21. Of course, when the container 100 is supported upon the platform 31, it is moved with the platform 31 with respect to the chassis 21 and into respective low and high positions, so as to facilitate loading and unloading of the container 100 with respect to the platform 31.

Interlock mechanism 130 is provided between the control lever 121 and the handle 84, so as to compel coordinate control of the control valve 120 with relation to the position of the handle 84, as shown in FIGS. 9 and 10. Specifically, a link 131 is pivotally secured intermediate the ends thereof to the structure 83 by a pivot pin 132. The outer end of the link 131 is pivotally connected to the inner end of a rod 133 by a pin 134; and the outer end of the rod 133 is pivotally connected to the lever 121 by a pin 135. The inner end of the link 131 terminates in a hook-like lock member 136 that cooperates with a projection-like lock member 137 rigidly affixed to the latch bar 81.

In view of the above description it will be understood, when the lever 121 is moved into its low position, as illustrated in FIG. 9, the link 131 is rotated about the pivot pin 132 to align the slot in the hook-like lock member 136 with the projection-like lock member 137; whereby the latch bar 81 may be rotated by the handle 84. Specifically, the handle 84 may be rotated into its latch positions, as illustrated in FIG. 9, so that the lock member 137 is rotated into its lock position in the lock member 136; whereby the lever 121 is locked in its low position, as the latch bars 81 and 82 are operated into their latch position to latch the platform 31 to the chassis 21 and to latch the base 101 of a container 100 to the platform 31, in the event the container 100 is mounted upon the platform 31 at this time. The lock position of the interlock mechanism 130 positively prevents operation of the lever 121 out of its low position, when the latch bars 81 and 82 occupy their latch positions.

When it is desirable to elevate the platform 31 with respect to the chassis 21, the handle 84 is first operated into its unlatch position, whereby the latch bars 81 and 82 cause the platform 31 to be unlatched from the chassis 21 and cause the base 101 of a supported container 100 to be unlatched from the platform 31. Also, operation of the latch bar 81 into its unlatch position rotates the lock member 137 out of the lock member 136; whereby the lever 121 is unlocked in its low position. Now the lever 121 may be pivoted outwardly into its high position, since the lock member 136 is not restrained by the lock member 137. When the lever 121 is thus operated into its high position, the valve 120 is controlled to cause the motors 50 and 70 to be governed to elevate the platform 31 into its high position, as previously explained. Of course, a container 100 supported by the platform 31 is elevated with the platform 31 in an obvious manner. When the lever 121 is thus operated into its high position, the link 131 is rotated in the counter-clockwise direction, as viewed in FIG. 9; whereby the body of the lock member 136 is positioned below the lock member 137 and in interfering relation therewith, so as to prevent operation of the handle 84 from its unlock position into its lock position while the lever 121 occupies its high position.

The arrangement of the interlock mechanism 130 between the lever 121 and the handle 84 positively prevents operation of the motors 50 and 70 to move the platform 31 away from the chassis 21, when the platform 31 in its low position is latched to the chassis 21.

In view of the foregoing, it is apparent that there has been provided an improved freight transportation system comprising an improved road vehicle provided with an elongated longitudinally extending chassis, an elongated longitudinally extending platform mounted on top of the chassis for vertical movements between low and high positions with respect to the chassis, motor means for selectively moving the platform between its respective low and high positions, latch mechanism for selectively latching and unlatching the platform in its low position with respect to the chassis, and interlock mechanism for positively preventing control of the motor means to move the platform from its low position into its high position when the latch mechanism occupies its latch position latching the platform in its low position to the chassis. Also, the system comprises a freight container provided with a base that is adapted to be removably supported upon the top of the platform and movable therewith with respect to the chassis; and the latch mechanism carried by the road vehicle is arranged so that it also selectively latches and unlatches the container in its supported position to the platform.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A road vehicle comprising an elongated longitudinally extending chassis, an elongated longitudinally extending platform mounted on said chassis for vertical movements between respective low and high positions with respect to the top of said chassis, motor means interconnecting said chassis and said platform and operative selectively to move said platform between its low and high positions, a manually operable controller having low and high positions, means controlled by operation of said controller into its low position for governing said motor means to move said platform into its corresponding low position and controlled by operation of said controller into its high position for governing said motor means to move said platform into its corresponding high position, latch mechanism cooperating between said chassis and said platform and having a latch position latching said platform in its low position to said chassis and having an unlatch position unlatching said platform in its low position from said chassis, a manually operable handle having a latch position operating said latch mechanism into its corresponding latch position and having an unlatch position operating said latch mechanism into its corresponding unlatch position, interlock mechanism cooperating between said controller and said handle and having a lock position locking said controller in its low position and an unlock position unlocking said controller in its low position, and means controlled by operation of said handle into its latch position for actuating said interlock mechanism into its lock position and controlled by operation of said handle into its unlatch position for actuating said interlock mechanism into its unlock position, whereby said interlock mechanism prevents operation of said controller out of its low position and into its high position when said latch mechanism occupies its latch position latching said platform in its low position to said chassis.

2. The road vehicle set forth in claim 1, wherein said platform is mounted on top of said chassis so that when said platform occupies its low position the bottom of said platform is in engagement with the top of said chassis and so that when said platform occupies its high position the bottom of said platform is spaced well above the top of said chassis.

3. The road vehicle set forth in claim 1, wherein the width of said platform is substantially the same as that of said chassis and the length of said platform is only somewhat less than that of said chassis, and said platform is mounted on said chassis so that when said platform occupies its low position the sides of said platform are substantially flush with the sides of said chassis and the rear end of said platform is substantially flush with the rear end of said chassis.

4. The road vehicle set forth in claim 1, wherein said motor means essentially comprises front and rear motors respectively disposed adjacent to the front and rear ends of said platform, and each of said motors is of the piston-cylinder fluid-operated type.

5. A road vehicle comprising an elongated longitudinally extending chassis, an elongated longitudinally extending platform arranged on top of said chassis, upstanding front structure carried by said chassis adjacent to the front end of said platform, depending rear structure carried by said chassis adjacent to the rear end of said platform, a front motor of the expansion-contraction type operatively interconnected between said front structure and the front end of said platform, a rear motor of the expansion-contraction type operatively interconnected between said rear structure and the rear end of said platform, said front motor having an expanded position moving the front end of said platform into a low position with respect to said chassis and a contracted position moving the front end of said platform into a high position with respect to said chassis, said rear motor having a contracted position moving the rear end of said platform into a low position with respect to said chassis and an expanded position moving the rear end of said platform into a high position with respect to said chassis, a manually operable controller having low and high positions, means controlled by operation of said controller into its low position for expanding said front motor and for contracting said rear motor so as to move the ends of said platform into their respective low positions with respect to said chassis and controlled by operation of said controller into its high position for contracting said front motor and for expanding said rear motor so as to move the ends of said platform into their respective high positions with respect to said chassis, latch mechanism cooperating between said chassis and said platform and having a latch position latching said platform in its low position to said chassis and having an unlatch position unlatching said platform in its low position from said chassis, a manually operable handle having a latch position operating said latch mechanism into its corresponding latch position and having an unlatch position operating said latch mechanism into its corresponding unlatch position, interlock mechanism cooperating between said controller and said handle and having a lock position locking said controller in its low position and an unlock position unlocking said controller in its low position, and means controlled by operation of said handle into its latch position for actuating said interlock mechanism into its lock position and controlled by operation of said handle into its unlatch position for actuating said interlock mechanism into its unlock position, whereby said interlock mechanism prevents operation of said controller out of its low position and into its high position when said latch mechanism occupies its latch position latching said platform in its low position to said chassis.

6. A road vehicle comprising an elongated longitudinally extending chassis, an elongated longitudinally extending platform mounted on said chassis for vertical movements between respective low and high positions with respect to the top of said chassis, motor means interconnecting said chassis and said platform and operative selectively to move said platform between its low and high positions, a manually operable controller having low and high positions, means controlled by operation of said controller into its low position for governing said motor means to move said platform into its corresponding low position and controlled by operation of said controller into its high position for governing said motor means to move sadi platform into its corresponding high position, a pair of longitudinally spaced-apart latch mechanisms carried by said platform and adapted to cooperate with said chassis, said latch mechanisms having latch positions latching said platform in its low position at two longitudinally spaced-apart locations to said chassis and having unlatch positions unlatching said platform in its low position at the two longitudinally spaced-apart locations from said chassis, a manually operable handle having a latch position simultaneously operating said latch mechanisms into their corresponding latch positions and having an unlatch position simultaneously operating said latch mechanisms into their corresponding unlatch positions, interlock mechanism cooperating between said controller and said handle and having a lock position locking said controller in its low position and an unlock position unlocking said controller in its low position, and means controlled by operation of said handle into its latch position for actuating said interlock mechanism into its lock position and controlled by operation of said handle into its unlatch position for actuating said interlock mechanism into its unlock position, whereby said interlock mechanism prevents operation of said controller out of its low position and into its high position when said latch mechanisms occupy their latch positions latching said platform in its low position at the two longitudinally spaced-apart locations to said chassis.

7. A road vehicle comprising an elongated longitudinally extending chassis, an elongated longitudinally extending platform mounted on said chassis for vertical movements between respective low and high positions with respect to the top of said chassis, motor means interconnecting said chassis and said platform and operative selectively to move said platform between its low and high positions, a manually operable controller having low and high positions, means controlled by operation of said controller into its low position for governing said motor means to move said platform into its corresponding low position and controlled by operation of said controller into its high position for governing said motor means to move said platform into its corresponding high position, latch mechanism cooperating between said chassis and said platform and having a latch position latching said platform in its low position to said chassis and having an unlatch position unlatching said platform in its low position from said chassis, a manually operable handle having a latch position operating said latch mechanism into its corresponding latch position and having an unlatch position operating said latch mechanism into its corresponding unlatch position, manually operable lock mechanism cooperating between said platform and said handle and having a lock position locking said handle in its latch position and an unlock position unlocking said handle in its latch position, whereby said lock mechanism prevents operation of said handle out of its latch position into its unlatch position when said lock mechanism occupies its lock position, interlock mechanism cooperating between said controller and said handle and having a lock position locking said controller in its low position and an unlock position unlocking said controller in its low position, and means controlled by operation of said handle into its latch position for actuating said interlock mechanism into its lock position and controlled by operation of said handle into its unlatch position for actuating said interlock mechanism into its unlock position, whereby said interlock mechanism prevents operation of said controller out of its low position and into its high position when said latch mechanism occupies its latch position latching said platform in its low position to said chassis.

8. In combination, a road vehicle including an elongated longitudinally extending chassis, an elongated longitudinally extending platform mounted on said chassis for vertical movements between respective low and high positions with respect to the top of said chassis, motor means interconnecting said chassis and said platform and operative selectively to move said platform between its low and high positions, a manually operable controller having low and high positions, means controlled by operation of said controller into its low position for governing said motor means to move said platform into its corresponding low position and controlled by operation of said controller into its high position for governing said motor means to move said platform into its corresponding high position, a freight container including an elongated longitudinally extending base adapted to be removably supported on the top of said platform, whereby said freight container is movable in the vertical direction with said platform when said freight container is supported upon the top of said platform, latch mechanism carried by said platform and adapted to cooperate with both said chassis and said base, said latch mechanism having a latch position latching said platform in its low position to said chassis and latching said base in its supported position to said platform, said latch mechanism having an unlatch position unlatching said platform in its low position from said chassis and unlatching said base in its supported position from said platform, a manually operable handle having a latch position operating said latch mechanism into its corresponding latch position and having an unlatch position operating said latch mechanism into its corresponding unlatch position, interlock mechanism cooperating between said controller and said handle and having a lock position locking said controller in its low position and an unlock position unlocking said controller in its low position, and means controlled by operation of said handle into its latch position for actuating said interlock mechanism into its lock position and controlled by operation of said handle into its unlatch position for actuating said interlock mechanism into its unlock position, whereby said interlock mechanism prevents operation of said controller out of its low position and into its high position when said latch mechanism occupies its latch position latching said platform in its low position to said chassis and latching said base in its supported position to said platform.

9. In combination, a road vehicle including an elongated longitudinally extending chassis, an elongated longitudinally extending platform mounted on said chassis for vertical movements between respective low and high positions with respect to the top of said chassis, motor means interconnecting said chassis and said platform and operative selectively to move said platform between its low and high positions, a manually operable controller having low and high positions, means controlled by operation of said controller into its low position for governing said motor means to move said platform into its corresponding low position and controlled by operation of said controller into its high position for governing said motor means to move said platform into its corresponding high position, a freight container including an elongated longitudinally extending base adapted to be removably supported on the top of said platform, whereby said freight container is movable in the vertical direction with said platform when said freight container is supported upon the top of said platform, a pair of longitudinally spaced-apart latch mechanisms carried by said platform and adapted to cooperate with both said chassis and said base, said latch mechanisms having latch positions latching said platform in its low position at two longitudinally spaced-apart locations to said chassis and latching said base in its supported position at two longitudinally spaced-apart sites to said platform, said latch mechanisms having unlatch positions unlatching said platform in its low position at the two longitudinally spaced-apart locations from said chassis and unlatching said base in its supported position at the two longitudinally spaced-apart sites from said platform, a manually operable handle having a latch position simultaneously operating said latch mechanisms into their corresponding latch positions and having an unlatch position simultaneously operating said latch mechanisms into their corresponding unlatch positions, interlock mechanism cooperating between said controller and said handle and having a lock position locking said controller in its low position and an unlock position unlocking said controller in its low position, and means controlled by operation of said handle into its latch position for actuating said interlock mechanism into its lock position and controlled by operation of said handle into its unlatch position for actuating said interlock mechanism with its unlock position, whereby said interlock mechanism prevents operation of said controller out of its low position and into its high position when said latch mechanisms occupy their latch positions latching said platform in its low position at the two longitudinally spaced-apart locations to said chassis and latching said base in its supported position at the two longitudinally spaced-apart sites to said platform.

10. The combination set forth in claim 9, wherein said base comprises a pair of laterally extending latch bars at the two longitudinally spaced-apart sites and adapted to receive said latch mechanisms in their latch positions when said base is in its supported positions, thereby to effect the latching of said base in its supported position to said platform.

References Cited by the Examiner

UNITED STATES PATENTS

| | | | |
|---|---|---|---|
| 2,412,158 | 12/1946 | Kuehlman et al. | 214—512 |
| 2,935,218 | 5/1960 | Fritz | 214—512 |
| 3,059,592 | 10/1962 | Cozzoli | 214—38 X |
| 3,145,865 | 8/1964 | Rogers | 214—512 |
| 3,199,696 | 8/1965 | Chrysler et al. | 214—512 |

WILLIAM FELDMAN, *Primary Examiner.*

M. S. MEHR, *Assistant Examiner.*